United States Patent [19]

Yamazaki

[11] 4,110,392

[45] Aug. 29, 1978

[54] PRODUCTION OF POROUS SINTERED PTFE PRODUCTS

[75] Inventor: Etsuo Yamazaki, Iruma, Japan

[73] Assignee: W. L. Gore & Associates, Inc., Newark, Del.

[21] Appl. No.: 751,675

[22] Filed: Dec. 17, 1976

[51] Int. Cl.$^2$ .................. B29D 7/24; B29D 27/00
[52] U.S. Cl. .................. 264/127; 264/41; 264/DIG. 47
[58] Field of Search .......... 264/127, 175, 41, 288, 264/210 R, 154, 147, DIG. 47; 28/DIG. 1

[56] References Cited

U.S. PATENT DOCUMENTS 2,776,465  1/1957  Smith .................. 264/175

FOREIGN PATENT DOCUMENTS 2,413,221  10/1974  Fed. Rep. of Germany .......... 264/127
42-3,691  2/1967  Japan .................. 264/127
42-23,981  11/1967  Japan .................. 264/127

Primary Examiner—James B. Lowe
Attorney, Agent, or Firm—E. A. Uebler; J. S. Campbell

[57] ABSTRACT

The present invention provides porous polytetrafluoroethylene ("PTFE") products having fine pores and high porosity, the pore diameter being less than about 1,500Å, generally ranging from about 100Å to 1,000Å. The process for the manufacture of these products comprises: (a) shaping of a lubricated PTFE mixture, by extrusion and/or rolling; (b) a first stretching of the shaped mass while in an unsintered state; (c) free sintering of the stretched mass at a temperature above 327° C; and (d) a second stretching of the sintered mass. These porous PTFE products are suitable for use as gas separators, diaphragms, filters, and other applications.

6 Claims, 3 Drawing Figures

PRODUCTION OF POROUS SINTERED PTFE PRODUCTS

BACKGROUND OF THE INVENTION

1. Field of the Invention

The present invention relates to porous polytetrafluoroethylene products and a process for their manufacture. More particularly, it relates to porous PTFE products having high porosity and very fine pores, i.e., less than 1,500Å, and generally ranging from about 100 to 1,000Å in pore size. The process for the manufacture of these products comprises shaping PTFE powder by extrusion and/or rolling, a first stretching step, followed by free sintering, and then a second stretching step. The porous PTFE products obtained by this process have microscopic pores uniformly distributed over the product. They may be suitable for use as a gas separation membrane (for inert gas, isotope gas, etc.), as an electrolytic diaphragm, a fuel cell separator, a filter, and such other uses as will be obvious to one skilled in the art.

2. Description of the Prior Art

Polytetrafluoroethylene (hereinafter referred to as "PTFE") has excellent heat resistance, chemical resistance, insulation resistance, non-adhesiveness, self-lubrication, and has found wide use in industry and in daily life.

In the field of porous PTFE product, several processing methods are known. These methods are divided into the following groups: (a) weaving or knitting PTFE threads or filaments into sheets; (b) a process comprising shaping of a PTFE mixture with extractable fillers, and then dissolving or extracting the fillers from the shaped mass to form pores; and (c) a process consisting of the shaping of a blended lubricant-containing PTFE by extrusion and/or rolling, followed by the subsequent stretching of the resultant sheet while in an unsintered or sintered state, the stretching being performed either before or after lubricant removal.

However, the above conventional process (a) is complex and expensive, and gives a product having large pores and irregular pore size distribution. The above process (b) requires not only extractants, but also costly production equipment, and the product obtained may contain residual extractant thereby affecting the chemical properties of the product. The above method (c) does not generally provide a film having fine pores, defined here to be less than 2,000Å (0.2μ) in diameter.

SUMMARY OF THE INVENTION

In order to overcome the above-mentioned defects accompanying method (c), the applicant of the present invention has investigated that method, and found that a process comprising a first stretching of an extruded and/or rolled PTFE sheet, subsequent free sintering of the resultant sheet under no tension; followed by a second stretching gives a porous PTFE sheet having very fine pores, i.e., less than about 1,500Å (0.15μ) in diameter with a uniform pore distribution and pore continuity. These porous PTFE products have continuous fine pores having pore diameter less than 1,500Å (0.15μ), generally ranging from about 100Å to 1,000Å.

The process of the present invention comprises the shaping of lubricated PTFE by extrusion and/or rolling, followed by a first stretching of the extruded or rolled mass while in an unsintered state, then free-sintering the resultant mass at a temperature above 327° C allowing the mass to freely contract upon heating, followed by a second stretching of the sintered mass in at least one direction.

DETAILED DESCRIPTION OF THE INVENTION

Figure 1:
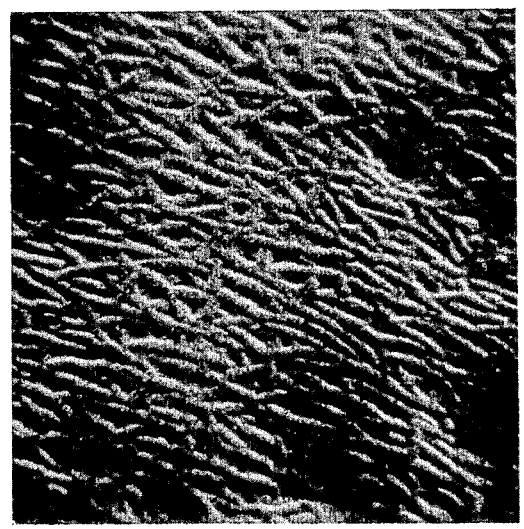
FIG. 1 is a photograph taken with an electron microscope showing the surface of the sintered PTFE sheet after the free-sintering stage described herein, taken at 30,000X magnification.
Figure 2:
FIG. 2 is a scanning electron microscope photograph, taken at 30,000X magnification, showing the surface of conventional sintered PTFE tape which was skived from a solid block of sintered PTFE.
Figure 3:
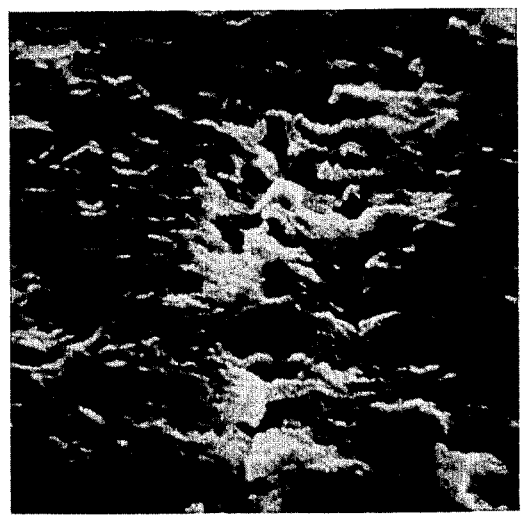
FIG. 3 is a scanning electron microscope photograph, taken at 30,000X magnification, of the final product of this invention.

Explanation will be made of the process of the present invention in sequential order starting from the beginning of the process.

(a) Shaping Stage

A PTFE blend to be shaped is prepared in the conventional manner commonly used in the manufacture of unsintered PTFE sheet. That is, unsintered PTFE fine powder or coagulated PTFE dispersion is blended with liquid lubricant. The applicable lubricant should be capable of wetting the PTFE surface, and of being removed below the PTFE melting point by evaporation or extraction. Examples of suitable lubricants include liquid hydrocarbons such as solvent naphtha, white oil, etc.: aromatic hydrocarbons such as toluene, xylene, etc., alcohols, ketones, esters, silicone oil, fluorocarbon oil, water containing surfactant, etc.

The amount of lubricant to be used will vary according to the shaping method used, to the size of the product desired, and to the amount and nature of additives which may be included with the PTFE resin. The amount of lubricant used is usually in the range of about 15 to 25 parts to 100 parts by volume of solids.

The blended PTFE may contain small amounts of additives such as pigment or modifier such as a copolymer of tetrafluoroethylene and hexafluoropropylene (FEP), depending on the use of the product.

Subsequently, the blended PTFE thus obtained is shaped by extrusion and/or rolling, generally by ram-extrusion, into a sheet, film or tube. This shaping is carried out at a temperature below the crystalline melting point of PTFE, ca. 327° C, commonly at a room temperature. Wall thickness of the shaped mass may be about 0.65 - 1.5 mm for the above explained uses, e.g. gas separator.

(b) First Stretching Stage

The unsintered shaped mass obtained by the above stage (a) is stretched in at least one direction. This stretching may be performed before or after the removal of the liquid lubricant, but better results are obtained after the removal of lubricant. The stretching temperature should be below the PTFE melt point, ca. 327° C. The stretching ratio is commonly 20 - 250%, i.e., 1.2 - 3.5 fold.

As a result of this stretching, the stretched mass becomes porous with uniformly distributed pores. The prior art teaches heating this stretched mass, while held by clamps to prevent retraction, to a temperature above ca. 327° C. However, the pore diameter so obtained is generally more than 4,000Å, and is always above 2,000Å. This method has never provided the pore diameters of the present invention, i.e., 100 – 1,500Å diameter. Further more, the restrained sintering results in an irregular pore size distribution unlike the uniform pore size distribution obtained by the following steps.

(c) Sintering Stage

Sintering of the stretched unsintered sheet obtained from the first stretching stage (b) is carried out under conditions in which the natural retraction or shrinkage on sintering mass is not restricted, i.e., the sheet is permitted to retract during sintering. (This sintering is denoted herein "free sintering".) The sintering temperature may be more than 327°, commonly about 360° C. The sintering time period depends on the mass to be heated and the type of resin, and generally ranges from about 1 to 20 minutes.

As a result of this sintering, the stretched mass shrinks to almost the same size it had been before the stretching. Also during sintering the porous structure produced by the stretching partially disappears through some melting to form a solid mass with increased strength. On the surface of the sintered mass, wrinkles with electron-microscopic-sized rows are uniformly formed.

FIG. 1 shows the wrinkles on the sintered sample of example 2 hereinbelow, No. 1, taken by a scanning electron microscope at a magnification of 30,000X. These wrinkles are considered to play an important role in achieving the object of the present invention.

(d) Second Stretching Stage

The sintered mass from the previous step (c) is stretched in at least one direction. This stretching is carried out below the crystalline melting temperature of PTFE, ca. 327° C, with a stretching ratio usually ranging from 100 to 1,000% (2 - 11 fold). The stretching speed can widely vary depending on the desired porosity and pore size, ranging from $1 \times 10^2$ to $2 \times 10^6$ mm/min., preferably from $2 \times 10^2$ to $3.5 \times 10^5$ mm/min. The product obtained by the second stretching may be heat-set at a temperature between about 100° and 150° C.

The second stretching stage produces fine pores, i.e., 100 - 1,500Å in diameter, in the sintered PTFE mass with a uniform pore distribution throughout the surface.

The present invention will be further illustrated by the following examples.

EXAMPLE 1

A PTFE blend was prepared by mixing 2,000 g of PTFE fine powder ("Teflon" 6-J, available from Mitsui Fluorochemicals Co., Ltd.) with 586 cc of liquid lubricant (solvent naphtha), preformed, and ram-extruded into a sheet 1 mm in thickness and 150 mm in width. The sheet was then rolled down to a thickness of 0.1 mm (shaping stage).

The thin sheet so formed was stretched about 20% while the sheet was held at a temperature of about 180° C, during which the naphtha was removed by evaporation (first stretching stage).

The stretched sheet was held at the ends by clamps which could move freely in order to compensate for the shrinkage of the sheet during sintering. The sheet was sintered at about 340° C for 3 minutes, while absorbing the retraction force caused by heating without generating tension in the sheet (free sintering stage).

Four sintered sheets thus obtained (No. 1 - 4) were again stretched under the conditions specified in Table 1, Column I, to give porous sheets (second stretching stage).

Table 1, Column II represents the characteristics of the porous sheets obtained by the above process.

Table 1

|  | I | | | II Characteristics | | |
|---|---|---|---|---|---|---|
|  | 2nd Stretching Conditions | | | | | permeability |
|  | ratio (%) | speed (x10⁵mm/min) | temp (° C) | porosity (%) | pore size (Å) | (sec/100 ml. in² cmHg) |
| Example |  |  |  |  |  |  |
| No. 1 | 344 | 1.83 | 150 | 47 | 398 | 512 |
| No. 2 | 200 | 1.83 | 150 | 24 | 321 | 118 |
| No. 3 | 380 | 1.66 | 150 | 55.7 | 480 | 148 |
| No. 4 | 350 | 1.66 | 150 | 49.0 | 606 | 334 |
| Comparative Example |  |  |  |  |  |  |
| (Skived Sheet) |  |  |  |  |  |  |
| No. 1 | 150 | 1.83 | 150 | 79.7 | 4,200 | 6.0 |
| No. 2 | 200 | 1.66 | 150 | 80.4 | 4,400 | 7.1 |
| No. 3 | 250 | 1.83 | 150 | Tape broke during stretching. | | |

In Table 1, permeability was measured by Ohken-type permeability gauge, the unit being sec/100 m. in². cmHg. Pore size was estimated by a gas separation method. [The pores obtained by the present invention were too small to be measured by the Ethanol Bubble Point method (EBP), compared with those of the skived sheet of the comparative Example discussed below.] In the gas separation method, a gas, permeated through a test membrane attached to one end of a pipe with a constant exit pressure, was analyzed by gas chromatography to determine the ratio of $O_2$ to $N_2$. Using this ratio, the pore size was calculated from the Martensson's equation for general gases, $dexp-1+(\alpha_0-1)(1-\gamma)S_2$.

For the purpose of comparison, three conventional sintered PTFE sheets were stretched under the conditions shown in Table 1. The conventional so-called skived sheets (commercially available) were produced by preforming a mixture of PTFE molding powder and liquid lubricant into a block, sintering the block, and skiving the block into a sheet 0.1 mm thick. The characteristics measured are also shown in Table 1 as comparative examples No. 1 - 3. In the comparative examples, pore sizes were measured by the EBP method.

EXAMPLE 2

A lubricated PTFE mixture, containing 120 cc of naphtha per pound of PTFE fine powder, was ram-extruded and calendared into a 0.1 mm film as in Example 1 (shaping stage).

Three sheets of the above film (no. 1 - 3) were processed into three porous films according to the first stretching, sintering, and second stretching stages, the conditions of which are shown in Table 2.

| | First Stretching (uniaxial) | | Sintering | | Second Stretching (uniaxial) | | |
|---|---|---|---|---|---|---|---|
| | Ratio % | temp. (° C) | temp. (° C) | time (min) | ratio (%) | speed (mm/min) | temp. (° C) |
| No. 1 | 200 | 300 | 340 | 15 | 400 | 500 | 100 |
| No. 2 | 100 | 300 | 340 | 15 | 300 | 500 | 150 |
| No. 3 | 50 | 300 | 340 | 15 | 300 | 500 | 150 |

Table 3 indicates the properties of the above porous films

Table 3

| | Pore Size (A) | Porosity (5) |
|---|---|---|
| No. 1 | 220 | 26.9 |
| No. 2 | 115 | 11.4 |
| No. 3 | 160 | 12.4 |

Pore size and porosity were measured at various locations in the sheets and found to be uniform.

According to the test results hereinbefore, the porous products obtained by the process of the present invention have fine pores which are uniformly distributed over the surface. These products are preferentially applicable to particular uses, which require fine pores and uniform pore size distribution, e.g., gas separator. The claimed process is simple and economical and is intended to encompass variations which are obvious to those skilled in the art.

What is claimed is:

1. A process for producing a porous product of sintered polytetrafluoroethylene, having a pore size of less than 2000Å, which comprises the following steps performed in sequence:
    (a) shaping an unsintered polytetrafluoroethylene mixture, containing a liquid lubricant, by extrusion, below the crystalline melt point of the polytetrafluoroethylene, to form a shaped extrudate;
    (b) a first stretching of said shaped extrudate in at least one direction at a temperature below about 327° C;
    (c) free sintering by heating said stretched shaped extrudate to a temperature above 327° C, said stretched shaped article being unrestrained and allowed to shrink to almost the same size it had been before stretching; and
    (d) a second stretching of said sintered, stretched, shaped extrudate at a temperature below the crystalline melt point at a speed in the range of about $1 \times 10^2$ to about $2 \times 10^6$ mm/min.

2. The process according to claim 1 in which said first stretching is carried out at a temperature between about 20° and 200° C.

3. The process according to claim 1 in which said shaped extrudate is stretched in said first stretching to a final length of about 1.2 to 3.5 times the initial length of said shaped extrudate.

4. The process according to claim 1 in which said sintering is carried out at a temperature between 327° and 400° C.

5. The process according to claim 1 in which said second stretching imparts an increase in length of said shaped, stretched, sintered extrudate of from 100 to 1,000%.

6. The process according to claim 1 in which said shaping of an unsintered polytetrafluoroethylene mixture is by rolling.

* * * * *